(12) United States Patent
Qin et al.

(10) Patent No.: US 8,054,637 B2
(45) Date of Patent: Nov. 8, 2011

(54) ELECTRONIC DEVICE WITH CHIP CARD

(75) Inventors: Zhong-Shu Qin, Shenzhen (CN); Hsiao-Hua Tu, Taipei Hsien (TW); Wen-Wei Song, Shenzhen (CN); Jun Wang, Shenzhen (CN); Ye Liu, Shenzhen (CN); Xu-Ri Zhang, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 467 days.

(21) Appl. No.: 12/327,473

(22) Filed: Dec. 3, 2008

(65) Prior Publication Data

US 2010/0014260 A1    Jan. 21, 2010

(30) Foreign Application Priority Data

Jul. 18, 2008 (CN) .......................... 2008 1 0302805

(51) Int. Cl.
*H05K 1/14* (2006.01)
(52) U.S. Cl. ........................ 361/736; 361/752; 455/556.1
(58) Field of Classification Search ............ 361/736; 455/556.1, 575.1, 569.2, 558
See application file for complete search history.

(56) References Cited

U.S. PATENT DOCUMENTS

2006/0286846 A1* 12/2006 Chen et al. ................ 439/325
* cited by examiner

*Primary Examiner* — Yuriy Semenenko
*Assistant Examiner* — Andargie M Aychillhum
(74) *Attorney, Agent, or Firm* — Altis Law Group, Inc.

(57) ABSTRACT

A electronic device (100) includes a removable chip card (40) for carrying information, comprise a housing (10) and a ejecting mechanism (30). The housing (10) defines a chamber (12) and a base (14) formed adjacent to the chamber. The chamber (12) is used for accommodating a battery (20) therein. The base (14) is used for receiving the chip card (40) therewith. The ejecting mechanism (30) is mounted in the housing (10) and includes a sliding member (32) and an elastic member (36). When the battery (20) is accommodated in the chamber (12), the chip card (40) is secured between the sliding member (32) and the battery (20). When the battery (20) is removed from the chamber (12), the elastic member (36) biases the sliding member (32) to eject the chip card (40) outwardly from the base (14).

18 Claims, 5 Drawing Sheets

ELECTRONIC DEVICE WITH CHIP CARD

BACKGROUND

1. Field of the Invention

The present invention relates to electronic devices having chip cards, and particularly to an electronic device having a mechanism for ejecting a chip card.

2. Description of Related Art

Commonly, portable electronic devices such as mobile phones use chip cards retained by a holder.

Typically, chip card holders define a receiving groove for receiving the chip card. The chip card is partly received in the receiving groove to electronically connect to a circuit of the device employing the chip card, and partly exposed so that it may be gripped for removal. However, the exposed part of the chip card is usually small and therefore difficult for a user to grasp in removing the chip card from the holder.

Therefore, there is room for improvement within the art.

BRIEF DESCRIPTION OF THE DRAWINGS

Many aspects of the exemplary electronic device with chip card ejecting mechanism can be better understood with reference to the following drawings. These drawings are not necessarily drawn to scale, the emphasis instead being placed upon clearly illustrating the principles of the present methods. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EXEMPLARY EMBODIMENTS

Figure 1:
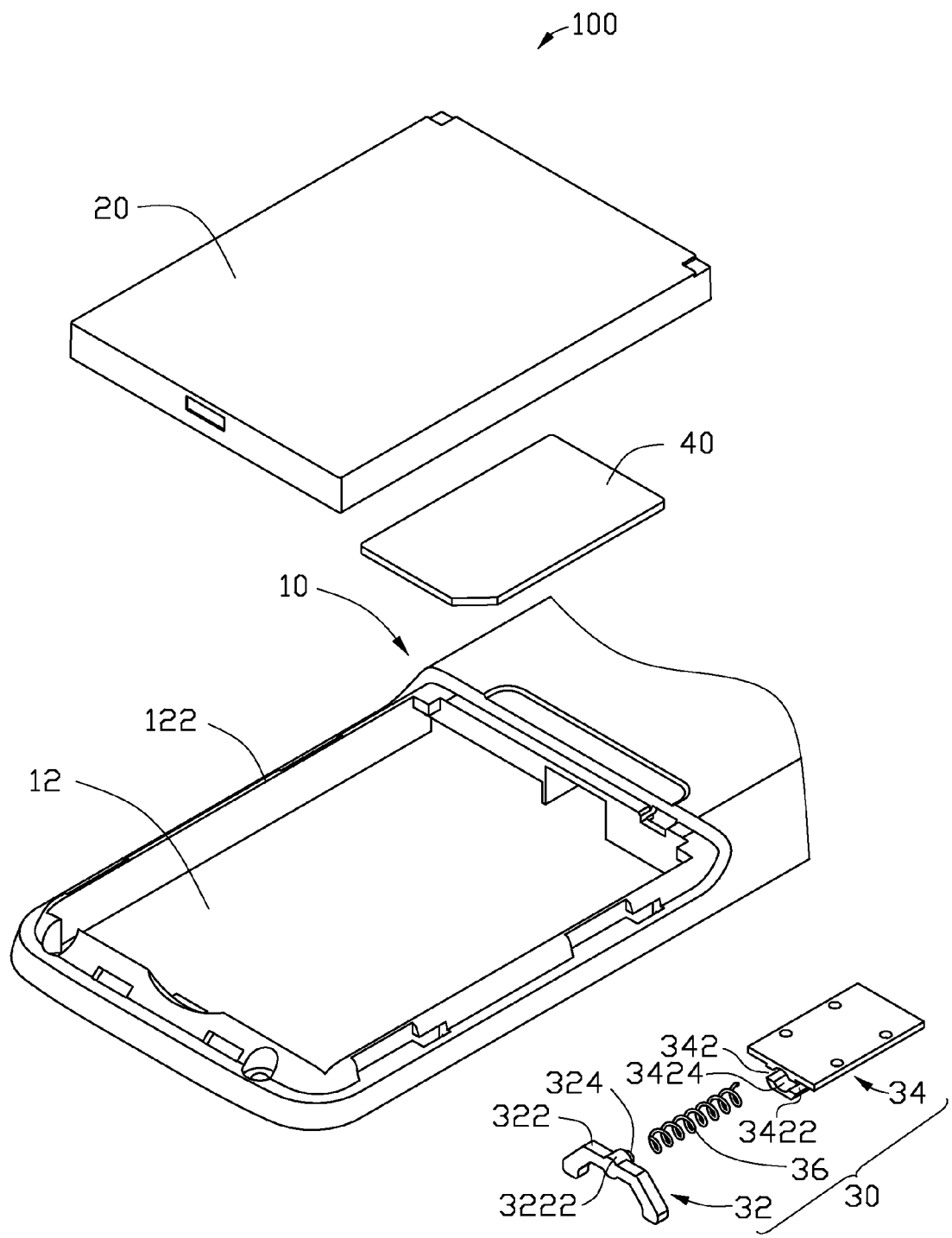
FIG. 1 is a schematic and exploded partial view of an electronic device with a chip card ejecting mechanism in accordance with an exemplary embodiment.
Figure 5:
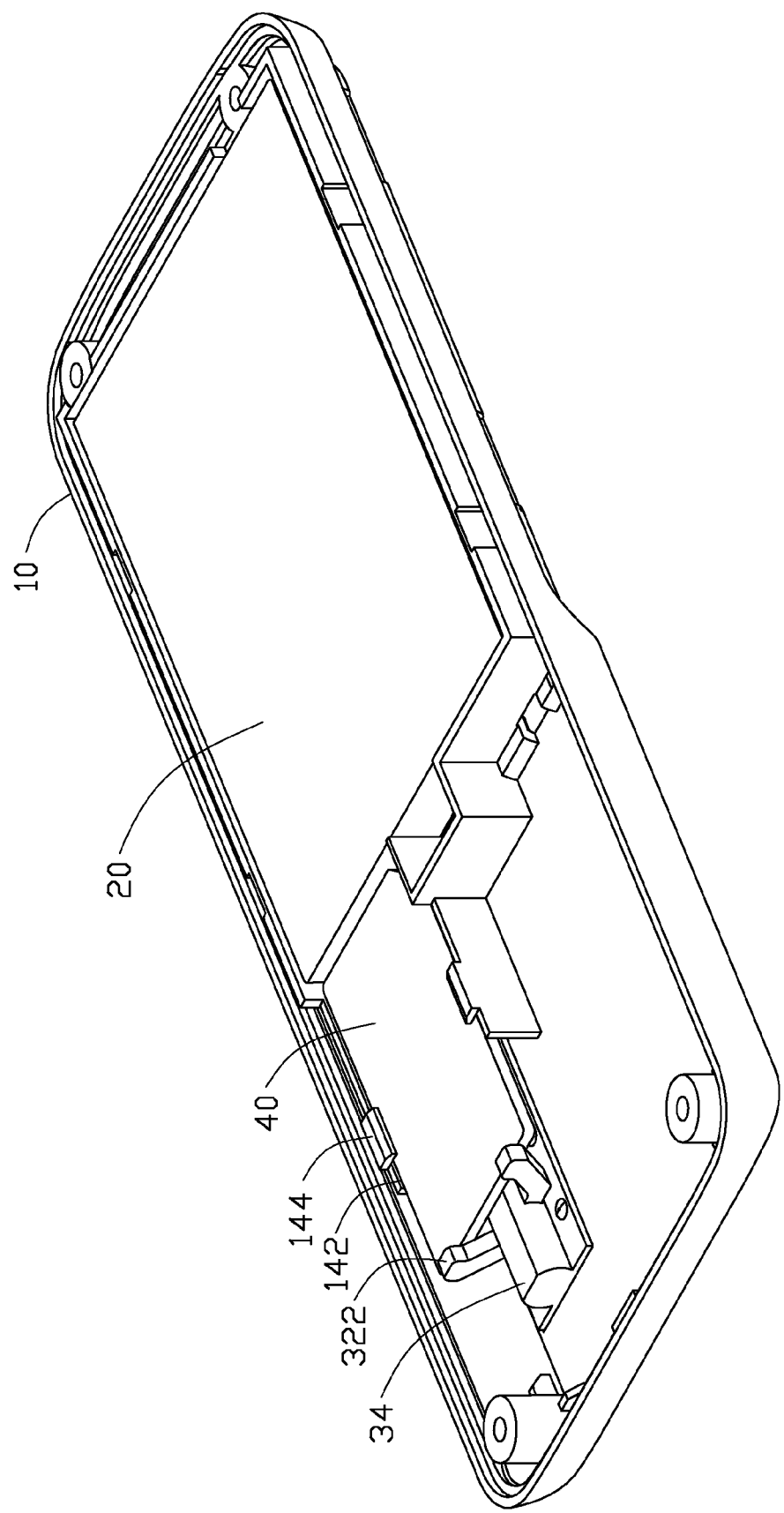
FIG. 5 is a schematic assembled view of the electronic device shown in FIG. 2 with a battery installed.

FIG. 1 shows an exemplary electronic device 100 (such as a mobile phone) including a housing 10, a battery 20 configured to be received within the housing 10, and an ejecting mechanism 30 configured to be mounted in the housing 10. Referring to FIG. 5, a chip card 40 (e.g., SIM card) is secured by the battery 20 and the ejecting mechanism 30.

Figure 2:
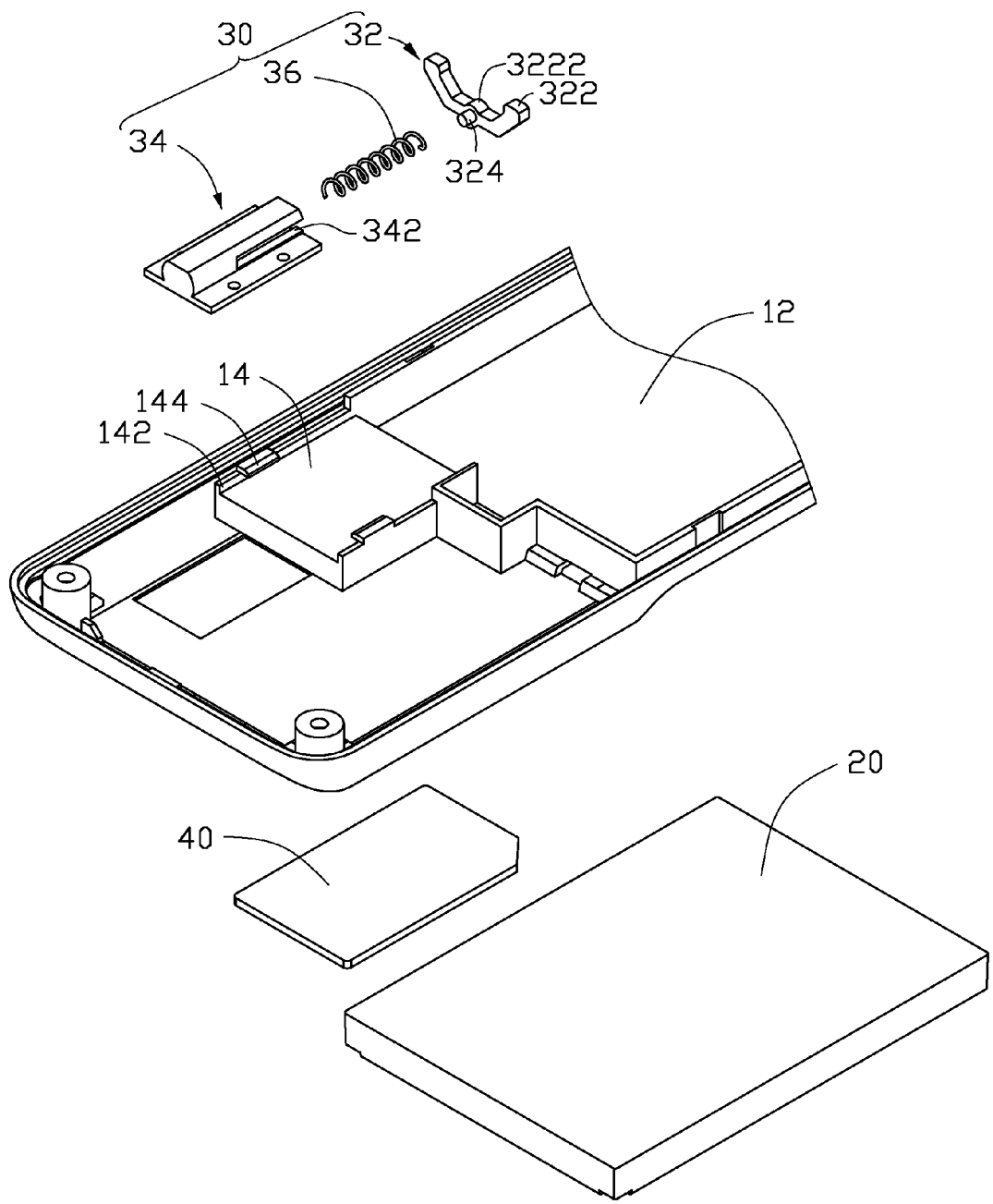
FIG. 2 is similar to FIG. 1 but shown from another aspect.

Referring to FIG. 2, the housing 10 defines a chamber 12 at one end for accommodating the battery 20. A peripheral wall 122 surrounds the chamber 12. A base 14 is formed on the housing 10 adjacent to the chamber 12, and the base 14 is configured for supporting and securing the chip card 40. The base 14 has two opposite edges, and each edge has an upwardly protruding stopping section 142. Each stopping section 142 has a hook 144 extending horizontally from a distal end of the stopping section 142 and above the base 14 towards the center thereof.

Figure 3:
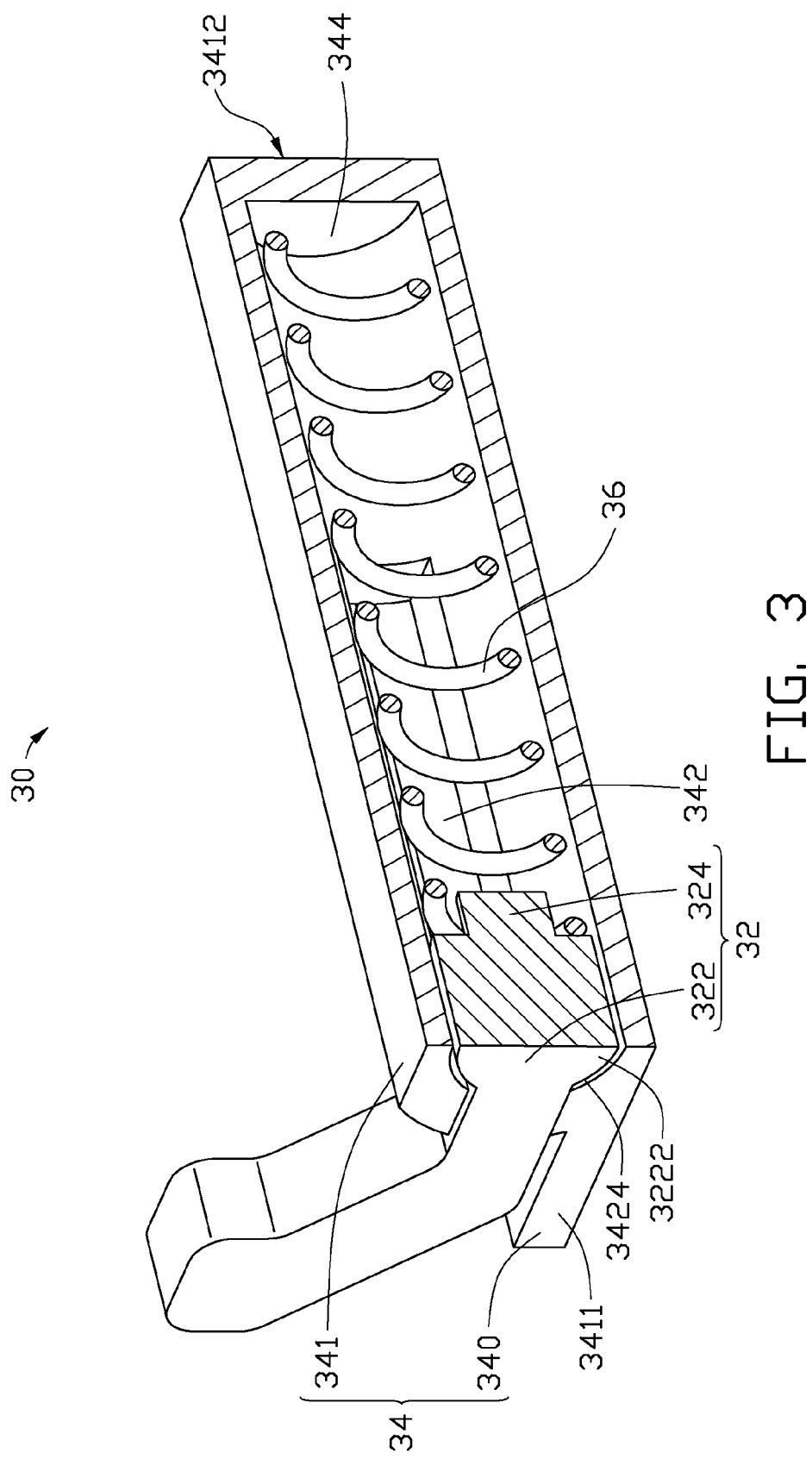
FIG. 3 is an assembled cross sectional view of an ejecting mechanism shown in FIG. 2.

Referring to FIGS. 1 and 3, the ejecting mechanism 30 includes a sliding member 32, a fixing member 34, and an elastic member 36 (e.g., a coil spring). The sliding member 32 includes an arched main body 322 and a block 324. The block 324 protrudes from the main body 322 and faces the elastic member 36. The main body 322 has two opposite positioning portions 3222 formed at two opposite ends thereof and configured for positioning within the fixing member 34.

The fixing member 34 is substantially rectangular, and includes a rectangular body 340, and a bar-like protrusion 341 (FIG. 3) protruding from one side of the rectangular body 340 and extending from one end of the rectangular body 340 to another end of the rectangular body 340 along a longitudinal direction. The bar-like protrusion 341 has a first end 3411 and an opposite second end 3412. The bar-like protrusion 341 defines a sliding groove 342 along a predetermined distance from the first end 3411 toward the second end 3412 and configured to slidably accommodate the main body 322. The sliding groove 342 is enclosed by two sidewalls 3422 (seen in FIG. 1). Each sidewall 3422 defines a positioning slot 3424 for positioning the corresponding positioning portion 3222. The fixing member 34 further defines a blind hole 344 at the second end 3412, communicating with the sliding groove 342, and for accommodating the elastic member 36.

Referring to FIG. 3, the elastic member 36 can provide a force for biasing the sliding member 32 away from the fixing member 34. The elastic member 36 has one end resisting against the end of the blind hole 344 of fixing member 34 and the opposite end for resisting against the sliding member 32.

Figure 4:
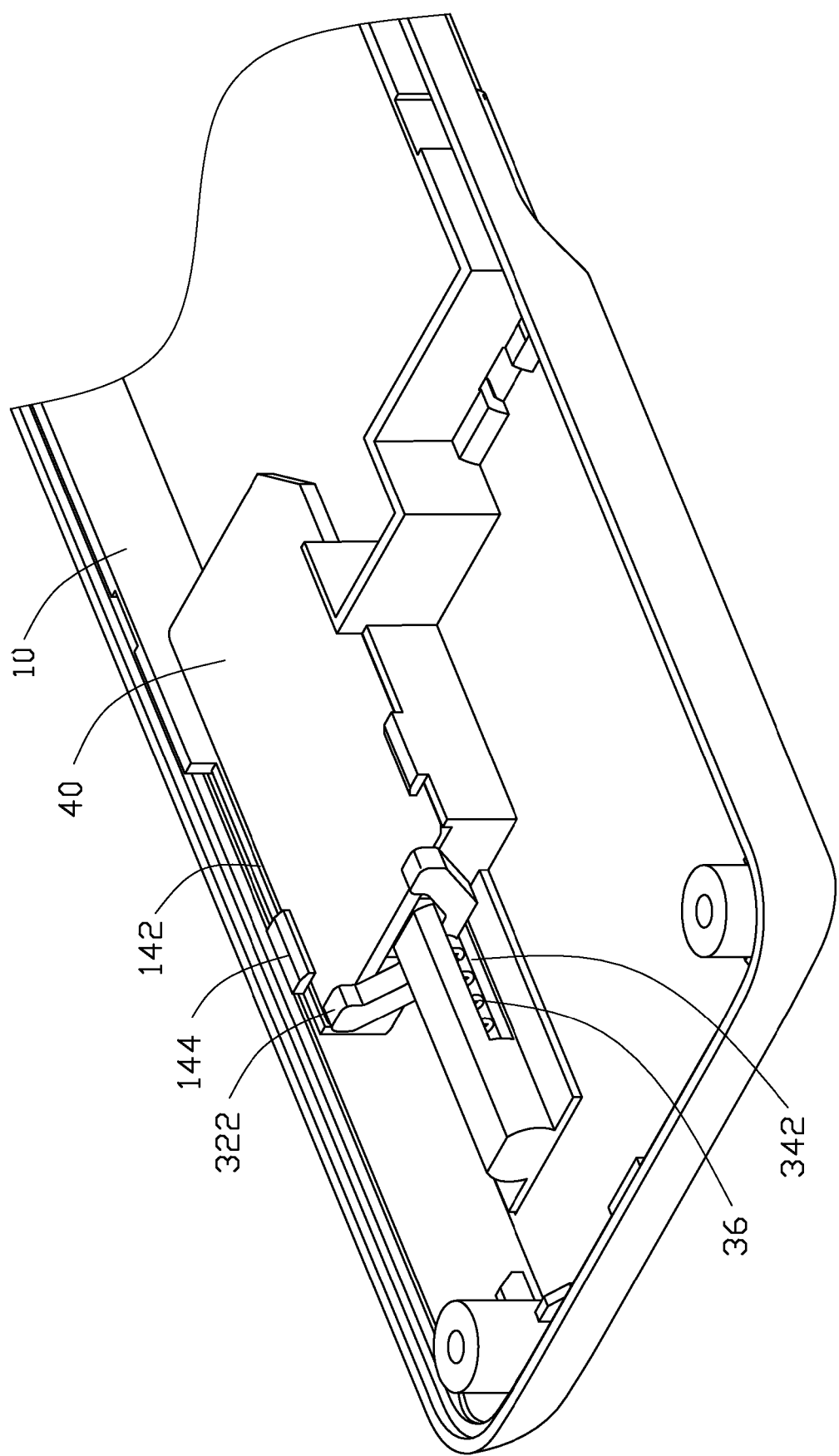
FIG. 4 is a schematic assembled partial view of the electronic device of FIG. 2.

Referring to FIGS. 3 and 4, to assemble the ejecting mechanism 30 to the housing 10, the elastic member 36 is inserted into the blind hole 344. The sliding member 32 slides into the sliding groove 342. During this stage, The elastic member 36 is compressed between the end of the blind hole 344 of fixing member 34 and the sliding member 32, with one end of the elastic member 36 receiving the block 324. The positioning portions 3222 are received and positioned in the positioning slots 3424. The fixing member 34 is secured to the housing 10 with the sliding member 32 resisting against the base 14.

Referring to FIGS. 4 and 5, to hold the chip card 40 within the electronic device 100, the chip card 40 is placed on the base 14, with the two opposite sides of the chip card 40 being limited by the stopping sections 142 and the hooks 144, and one end of the chip card 40 contacting the sliding member 32. After that, the battery 20 is received in the chamber 12, and presses against the opposite end of the chip card 40, causing the chip card 40 to push the sliding member 32 to compress the elastic member 36. The elastic member 36 accumulates an elastic force. Thus, the two opposite ends of the chip card 40 are secured between and by the sliding member 32 and the battery 20.

Referring to FIG. 3, to remove the chip card 40 from the electronic device 100, the battery 20 is removed from the chamber 12. Without the securing force of battery 20, the sliding member 32 then moves the chip card 40 toward the chamber 12 under the restoring force of the elastic member 36.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. An electronic device having a removable chip card, comprising:

a housing defining a chamber and a base formed adjacent to the chamber, the chamber used for accommodating a battery therein, the base used for receiving the chip card; and an ejecting mechanism mounted in the housing, and including a sliding member slidably mounted on the housing and an elastic member, wherein when the battery is accommodated in the chamber, the chip card is secured by and between the sliding member and the battery, and the elastic member is compressed to accumulate elastic force; after the battery is removed from the chamber, the sliding member automatically drives the chip card outwardly from the base under the compressed elastic force of the elastic member.

2. The electronic device as claimed in claim 1, wherein the chip card has two opposite ends, the two opposite ends are resisted between the sliding member and the battery.

3. The electronic device as claimed in claim 2, wherein the base has two opposite edges, each edge has an upwardly protruding stopping section, each stopping section has a hook extending horizontally from a distal end of the stopping section, each side of the chip card limited between a stopping section and a hook.

4. The electronic device as claimed in claim 1, wherein the ejecting mechanism further includes a fixing member mounted to the housing, the sliding member is slidably engaged with the fixing member, the elastic member provides an elastic force for driving the sliding member away from the fixing member.

5. The electronic device as claimed in claim 4, wherein the elastic member has one end resisting against a portion of the fixing member and another end resisting against the sliding member.

6. The electronic device as claimed in claim 4, wherein the sliding member includes a main body, the fixing member has a sliding groove corresponding to the main body, the main body slidably accommodated in the sliding groove.

7. The electronic device as claimed in claim 6, wherein the main body has a plurality of positioning portions protruding therefrom, the fixing member has a plurality of positioning slots corresponding to the positions portions, the positioning portions are slidably accommodated in the corresponding positions slots.

8. The electronic device as claimed in claim 6, wherein the sliding member includes a block protruding from the main body, the fixing member defines a blind hole communicating the sliding groove, the elastic member having one end accommodated in the blind hole and another end contacting the block.

9. The electronic device as claimed in claim 6, wherein the main body is arched.

10. An electronic device having a chip card for carry information, comprising: a housing having a chamber defined therein and a base formed thereon, and one end of the base facing the chamber, the chamber used for accommodating a battery therein, the base used for receiving the chip card therewith; and an ejecting mechanism located on the housing and facing another end of the base, the chip card being automatically ejected outwardly from the base by the ejecting mechanism after the battery is removed from the chamber; wherein the base has two opposite edges, each edge has an upwardly protruding stopping section; each stopping section has a hook extending horizontally from a distal end of the stopping section, each side of the chip card limited between a stopping section and a hook.

11. The electronic device as claimed in claim 10, wherein the chip has two opposite ends, the two opposite ends are resisted between the ejecting mechanism and the battery.

12. The electronic device as claimed in claim 10, wherein the ejecting mechanism includes a fixing member mounted to housing, a sliding member is slidably engaged with the fixing member, an elastic member provides an elastic force for driving the sliding member away from the fixing member.

13. The electronic device as claimed in claim 12, wherein the elastic member has one end resisting against a portion of the fixing member and another end resisting against the sliding member.

14. The electronic device as claimed in claim 12, wherein the sliding member includes a main body, the fixing member has a sliding groove corresponding to the main body, the main body slidably accommodated in the sliding groove.

15. The electronic device as claimed in claim 14, wherein the sliding member includes a block protruding from the main body, the fixing member defines a blind hole communicating the sliding groove, the elastic member having one end accommodated in the blind hole and another end contacting the block.

16. The electronic device as claimed in claim 14, wherein the main body has a plurality of positioning portions protruding therefrom, the fixing member has a plurality of positioning slots corresponding to the positions portions, the positioning portions are slidably accommodated in the corresponding positions slots.

17. The electronic device as claimed in claim 14, wherein the main body is arched.

18. An electronic device having a chip card for carry information, comprising: a housing having a chamber defined therein and a base formed thereon, and one end of the base facing the chamber, the chamber used for accommodating a battery therein, the base used for receiving the chip card therewith; and an ejecting mechanism located on the housing and facing another end of the base, the chip card being automatically ejected toward the chamber by the ejecting mechanism after the battery is removed from the chamber, wherein the chip has two opposite ends, the two opposite ends are resisted between the ejecting mechanism and the battery.

* * * * *